(12) United States Patent
Hansen et al.

(10) Patent No.: US 6,567,014 B1
(45) Date of Patent: May 20, 2003

(54) AIRCRAFT HEAD UP DISPLAY SYSTEM

(75) Inventors: Richard Hansen, Lake Oswego, OR (US); Robert B. Wood, Beaverton, OR (US); Brian Hartman, Escondido, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/434,537

(22) Filed: Nov. 5, 1999

Related U.S. Application Data
(60) Provisional application No. 60/107,186, filed on Nov. 5, 1998.

(51) Int. Cl.[7] .............................................. G01C 21/00
(52) U.S. Cl. ...................... 340/980; 340/974; 340/975; 345/7
(58) Field of Search ................................. 340/980, 973, 340/974, 975; 701/4, 14; 345/7, 8, 9; 359/630

(56) References Cited

U.S. PATENT DOCUMENTS

| | | | | |
|---|---|---|---|---|
| 4,582,389 A | | 4/1986 | Wood et al. ................. 350/3.69 |
| 4,977,401 A | * | 12/1990 | Sjöberg ........................ 340/973 |
| 5,198,812 A | * | 3/1993 | Probert ........................ 340/975 |
| 5,208,590 A | * | 5/1993 | Pitts ............................. 340/973 |
| 5,212,480 A | * | 5/1993 | Ferro ........................... 340/974 |
| 5,416,705 A | * | 5/1995 | Barnett ........................ 340/975 |
| 5,798,713 A | * | 8/1998 | Viebahn et al. ............. 340/974 |
| 6,057,786 A | * | 5/2000 | Briffe .......................... 340/975 |
| 6,150,960 A | * | 11/2000 | Voulgaris ..................... 340/975 |
| 6,272,477 B1 | * | 8/2001 | Kelly, III et al. .............. 706/5 |

OTHER PUBLICATIONS

"Head–Up Displays Designing the way ahead" by Richard L. Newman, pp. 80–95.

\* cited by examiner

*Primary Examiner*—Brent A. Swarthout
(74) *Attorney, Agent, or Firm*—Nathan O. Jensen; Kyle Eppele

(57) ABSTRACT

An aircraft head up display system that displays a basic mode, an en route mode, or an approach/landing mode. When the aircraft attitude changes to predefined unusual attitude conditions, the display changes to an unusual attitude mode to indicate the unusual attitude condition. The display in the unusual attitude mode removes non-essential symbols and displays the aircraft air speed, altitude and attitude. The attitude display includes an unusual attitude ball display containing a horizon symbol, a series of simulated section lines to indicate an area below the horizon, a pitch ladder, a water line indicator, and a roll indicator.

14 Claims, 10 Drawing Sheets

AIRCRAFT HEAD UP DISPLAY SYSTEM

RELATED APPLICATION

This application claims the benefit of U.S. Provisional Application No. 60/107,186, filed Nov. 5, 1998.

TECHNICAL FIELD

The present invention relates to aircraft head-up display (HUD) systems and, in particular, to HUD display strategies and symbologies to aid a pilot in detecting and recovering from unusual aircraft attitudes (climb/dive pitch and or roll) during flight.

BACKGROUND OF THE INVENTION

HUD systems are now widely used in both military and commercial aircraft to provide pilots with essential information superimposed onto their forward field of view through the aircraft windshield. The information displayed is typically data and/or symbolic images indicative of flight conditions, such as aircraft altitude or airspeed, navigation information, or guidance information.

FIG. 1 generally illustrates a side view of the optics geometry of a head up display system in the cockpit 10 of an aircraft 11 having a windshield 12. A pilot is shown at 13 with an eye shown at an eye reference point 14 within an eyebox (exit pupil) indicated by dashed lines 15. The eye reference point 14 is a geometrical point in space. FIG. 2 illustrates a field of view from the pilot to the combiner 20.

Guidance information displayed on a HUD combiner for observation by a pilot generally includes symbology that represents position and attitude guidance for the aircraft during flight. One example is a flare anticipation cue implemented in a Flight Dynamics head-up guidance system that is certified by the Federal Aviation Administration for use on Boeing 737-300 aircraft. The flare anticipation cue alerts the pilot several seconds before the aircraft reaches a flare initiation height and indicates to the pilot the pitch up rate required at the initial part of the flare.

Another application of head-up displays is guidance information that can be displayed to a pilot during low visibility ground weather conditions to assist the pilot after touchdown in safely taxiing the aircraft to the airport terminal. A pending patent application, also owned by the assignee of the present application, describes methods and symbologies for taxi mode of operation, including the production of a turn anticipation cue that, together with a turn direction arrow, is displayed as a symbol on a HUD system combiner as part of aircraft rollout on an active runway and taxi operations to and from an airport terminal. The turn anticipate cue alerts the pilot that a turn from the current path of the aircraft is approaching within a predetermined time or distance. HUD displays thus can be used in various modes of operation, including a basic mode, en route mode, approach/landing mode and a taxiing mode as noted.

One very important yet challenging task is to design a HUD display to assist the pilot in recognizing and recovering from an unusual attitude (UA) of the aircraft. One important aspect of the problem is to enable the pilot to quickly and accurately identify which way is up (away from the center of the earth). In a heads-down display (HDD), color is used to advantage in this regard. An attitude display or attitude indicator ball in the HDD displays a straight line representing the horizon; solid brown color below the horizon (i.e. toward the ground), and a solid blue color field above the horizon to indicate the direction of the sky. That combination of indicia makes it easy for the pilot to quickly identify which way is up. Most head-up displays, however, are limited to simple monochromatic symbologies: Solid fields, shading, cross-hatching and the like generally are not used because they occlude the view through the windshield outside the aircraft. Consequently, attitude indicators like the HDD cannot be used for HUD.

Another challenge in addressing unusual attitudes in HUD arises because HUD's provide a very limited field of view (FOV). For example, a typical HUD today provides a 30 degree by 24 degree FOV (The dimensional units most often used to describe symbol size and position are miliradians (mrad) of angular arc. Either way, a specified viewing distance is required to convert to equivalent linear dimensions of the display). Given the relatively limited FOV available in the HUD, display of a wide range of conformal climb/dive pitch angles is not possible. One means to increase the range of angles displayed is through pitch compression. However, compression of the pitch ladder is undesirable, at least in some circumstances, as it may to lead to disorientation. Put another way, a "conformal" or one-to-one display on the HUD consistently tracks the "real world" that the pilot is viewing through the windshield. Compression seems necessary in order to accurately display the more extreme excursions in pitch and roll that occur during unusual UA's, yet conformal orientation cues may be superior in just those situations. There is some controversy as to the most appropriate approach. If full-time scaling is not selected, this issue is further complicated by consideration of switching between compressed and noncompressed display modes; for example, should a compression mode switch take place gradually or in a discrete step. See Newman at page 87.

FIGS. 3 and 4 illustrate a typical prior art HUD display. The features and symbols employed in this type of display shown in FIG. 3 and 4 include the following: to the left side of the display is an air speed indicator 302, in this case a "tape" display combining both analog and digital features. A digital ground speed indicator 304 also is provided in the lower left quadrant of the display. Other known air speed indicators include digital and counter-pointer symbols. To the right side of the display is an altitude indicator 310. In this case, an altitude "tape" is shown. A digital vertical speed indicator 306 also is provided generally in the lower right hand quadrant of the display. Again, other types of altitude displays are known in the art. Referring to FIG. 4, the display 300 includes a horizon indicator 312, in this case a straight line segment with no break. A conventional pitch ladder 314 is provided for indicating climb/dive attitude in conjunction with the horizon 312.

The pitch ladder 314 in FIG. 4 includes a series of steps, spaced apart typically in 5 degree pitch increments. There, the steps are labeled 5, 10, (0 is the horizon line 312), and finally minus 5 degrees. Each pitch step indicator comprises a pair of line segments with a space in the middle, symmetrically arranged about the water line indicator 316, and having perpendicular ends on the outboard side of each line segment pointing toward.the horizon; for example, see reference number 315. The water line symbol 316, also called a bore sight, indicates an axis parallel to the fuselage of the plane and generally remains in a fixed position near the center of the FOV.

An airplane: symbol 320 in FIG. 4 indicates the current flight path of the aircraft. In the display of FIG. 4, the aircraft is in what would generally be considered an unusual attitude. The display indicates a pitch of about 2 degrees and a roll, angle of about 140 degrees. Here, an "Augie arrow" 322 is displayed to point toward the horizon. The Augie arrow has been suggested for use during unusual attitudes as an orientation cue, but we consider it too small and too subtle and not compelling enough to be useful in identifying and recovering from a UA.

FIG. 5 is another example of a prior art HUD display, including most of the features and symbols already described with reference to FIG. 4. In FIG. 5, the horizon 330 is shown as a dashed line, known as a ghost horizon. In this case, the pitch ladder provides the usual 5 degree steps; and it can be observed that 0 degrees pitch is just about where the horizon 330 is shown in the drawing. As the pitch ladder moves further down in the display (presumably as the aircraft assumes a greater pitch), the horizon would no longer be visible on the display (assuming no automatic compression of the ladder). The ghost horizon is dashed to indicate that it is no longer a conformal representation of the horizon relative to the pitch ladder. However, albeit dashed, the horizon symbol 330 remains visible on the display at all times, thereby providing at least a minimal orientation cue as to which direction is up or down.

SUMMARY OF THE INVENTION

One aspect of the present invention provides for a dramatic change in the HUD display appearance when a UA is encountered during flight. The UA is defined as a climb/dive pitch angle and/or a roll angle that exceeds pre-defined limits. These can be individually programmed and will depend upon a particular aircraft and other variables. The HUD system is programmed to monitor pitch and roll, and switch into a UA display mode when a UA is encountered. The switch to UA display mode should be discrete rather than gradual, and it may be punctuated by flashing the entire display screen several times within the span of about one second. The UA mode of display is characterized by decluttering the display so as to remove most of the non-essential symbols that appear during other modes of operation. What remains on the UA display mode is essentially three components: an air speed indicator, an altitude indicator and an attitude indicator. In a presently preferred embodiment, the air speed indicator is shown on the left side of the display in the form of a conventional air speed tape. The right side of the display features an altitude display tape. The center of the display in UA mode consists of a large, unitary attitude display element, in the form of a single closed shape such as a circle or rectangle.

Within the attitude display, absence of clutter remains important, but the following symbols generally should be included: a horizon, a center line perpendicular to the horizon, at least a bilaterally symmetrical pair of sectional lines on either side of the center line and converging toward the horizon; a conformal pitch ladder aligned with the center line (i.e. generally perpendicular to the horizon); a water line indicator at the center of the attitude display; and a roll scale and roll indicator extending along at least a portion of the periphery of the attitude display component.

In one embodiment, the attitude display is circular, referred to as a UA ball display (UABD). Regardless of the selected shape of the attitude display, the horizon appears within the display at all time, even if truncating the pitch ladder becomes necessary in order to preserve the horizon display.

Additional objects and advantages of this invention will be apparent from the following detailed description of preferred embodiments thereof which proceeds with reference to the accompanying drawings.

DETAILED DESCRIPTION OF PREFERRED EMBODIMENT

Figure 6:
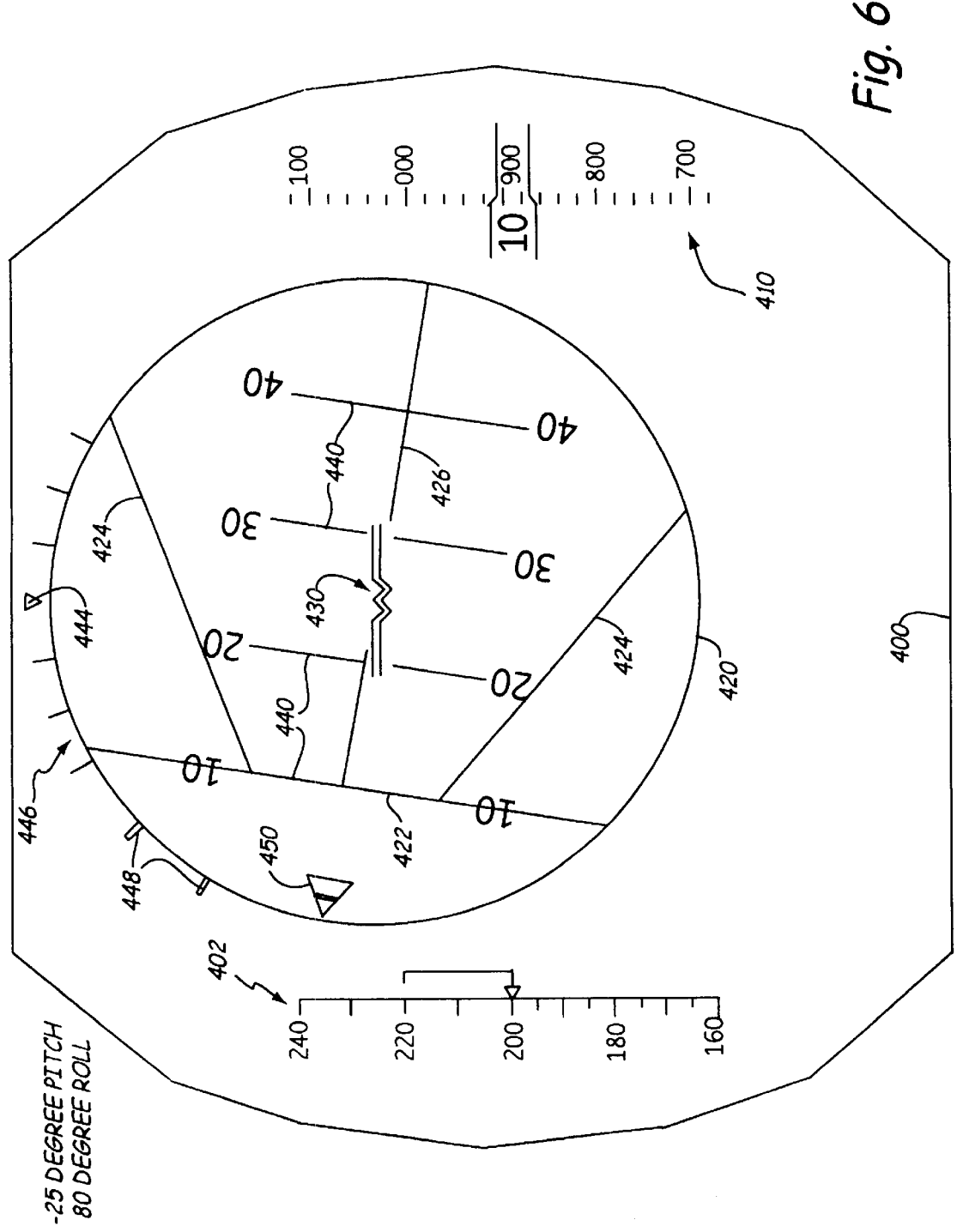
FIG. 6 illustrates a HUD display according to the present invention indicating minus 25 degrees pitch and 80 degrees roll.

FIG. 6 is a first illustration of a HUD display according to the present invention. Several characteristics distinguish this display from the prior art just described. First, it will be noted that the display is relatively simple and uncluttered. It consists of three primary display elements: an air speed tape 402 on the left side, an altitude tape 410 on the right side, and a UA ball display 420 in the center of the FOV. The UABD 420 is sized to occupy a substantial portion of the FOV. For example, it should have a diameter at least approximately equal to one-half of the horizontal dimension of the FOV, and preferably somewhat greater than that size. It should be noted that all display symbology other than the three elements just noted have been removed to declutter the display. This dramatic change in the appearance of the display served to immediately alert the pilot that the plane is in a UA. The definition of a UA will of course vary with the type of aircraft and application, and can be programmed as appropriate in the HUD system. For example, pitch or roll angles greater than ±20 to 25 degrees may be unusual for a commercial airliner, whereas there are some military aircraft that routinely perform in more extreme attitudes, so more liberal parameters would be used. It may be noted here that hysteresis is advisable to avoid distracting oscillations between the normal display mode and the UA mode.

Referring once again to FIG. 6, the UA ball display element 420 includes a horizon symbol 422 consisting of a solid straight line, forming a chord relative to the circle 420 that circumscribes the UABD. While the horizon symbol 422 will rotate and move about under various conditions described below, it always forms a chord of the circle 420 and it remains visible at all times. A series of simulated section lines 424, preferably three or more such lines, are angularly spaced apart and generally converge toward the horizon 422. These simulated section lines include a center line 426 perpendicular to the horizon 422 and converging lines 424 symmetrically arranged about the center line 426. The center line 426 and converging lines 424 are displayed only in an area of the ball display 420 that is "below" the horizon 422. In other words, these lines 426, 424 indicate which direction is down relative to the horizon. They are reminiscent of a simulated vanishing point to simulate the ground display symbol, a characteristic that further aids in distinguishing "down" versus "up" relative to the horizon.

Figure 1:
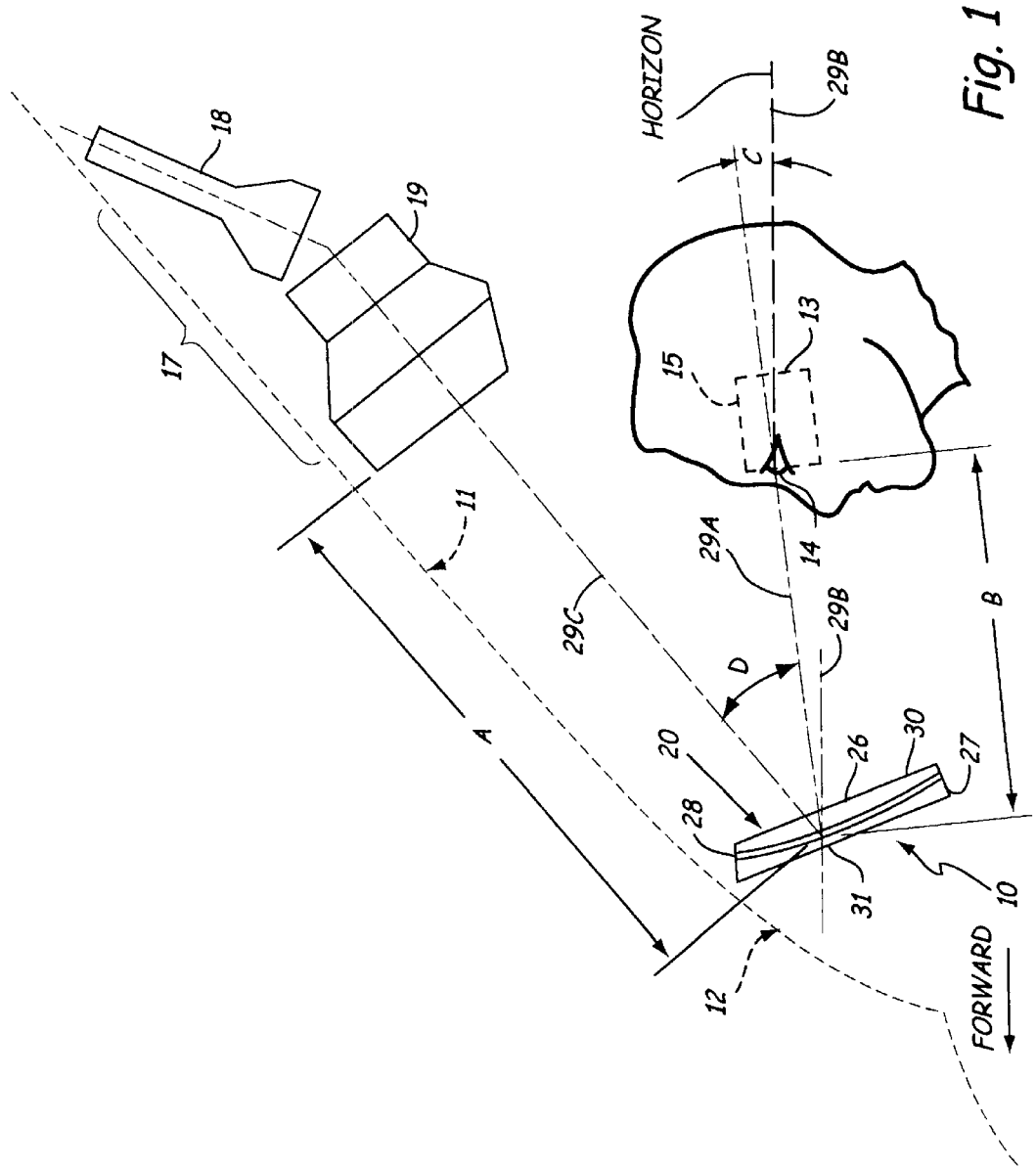
FIG. 1 illustrates a typical head-up display arrangement.
Figure 2:
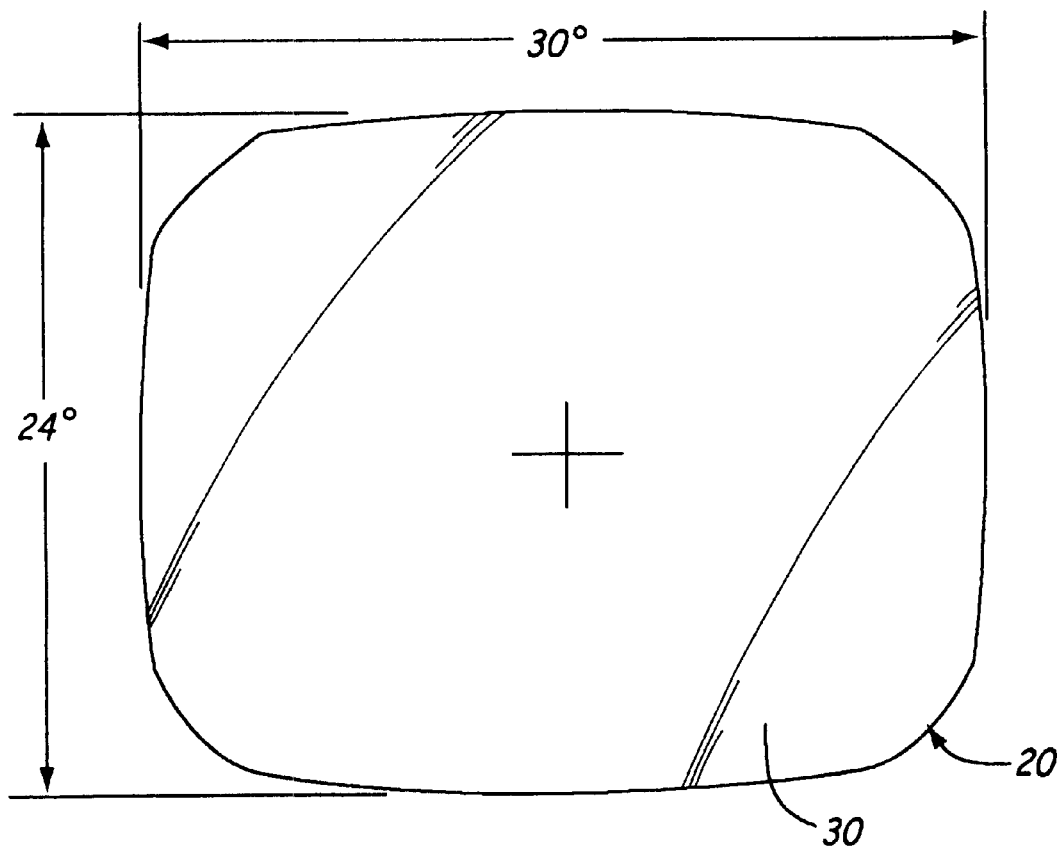
FIG. 2 illustrates a typical HUD field of view.
Figure 3:
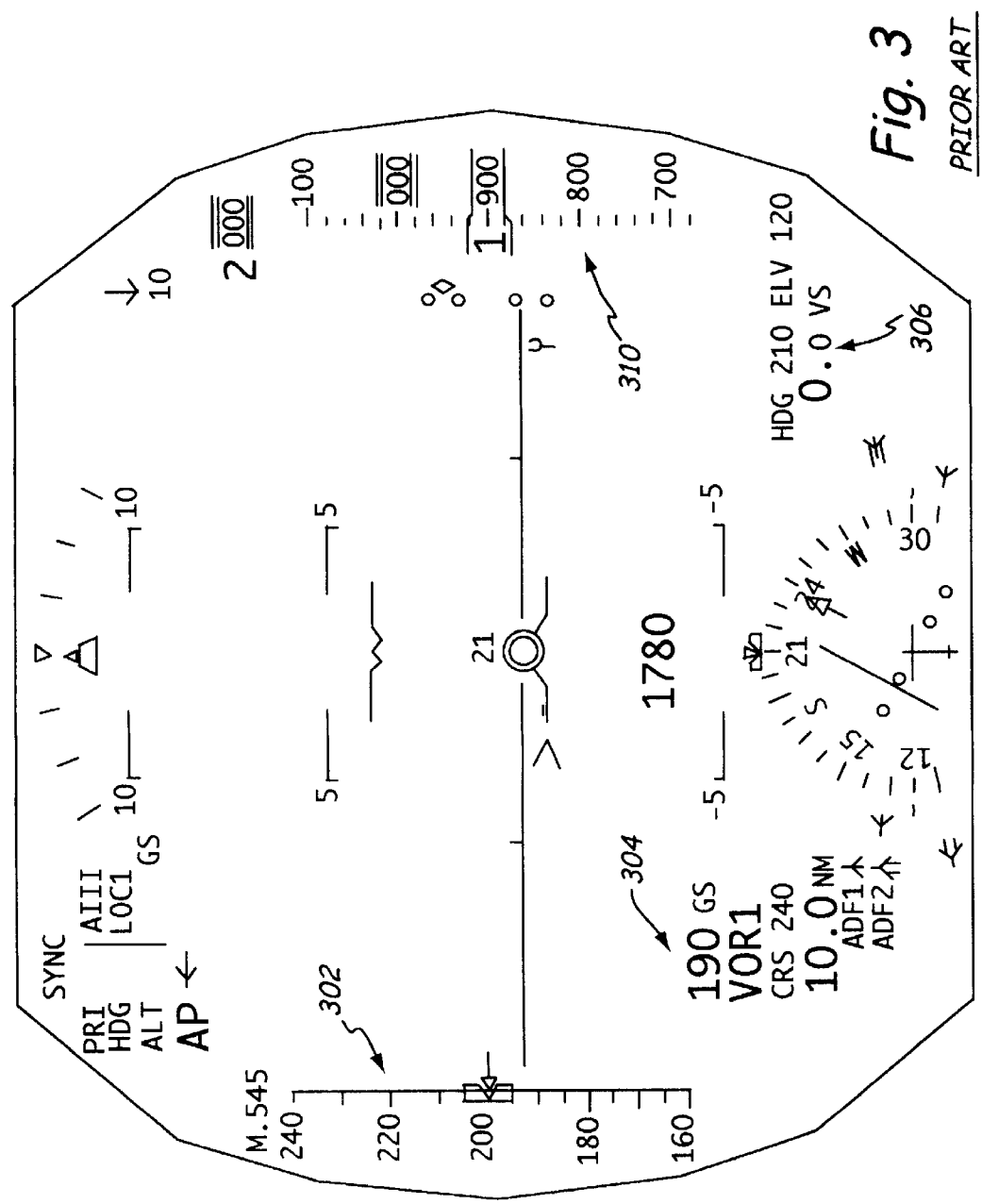
FIG. 3 illustrates a prior art HUD display.
Figure 4:
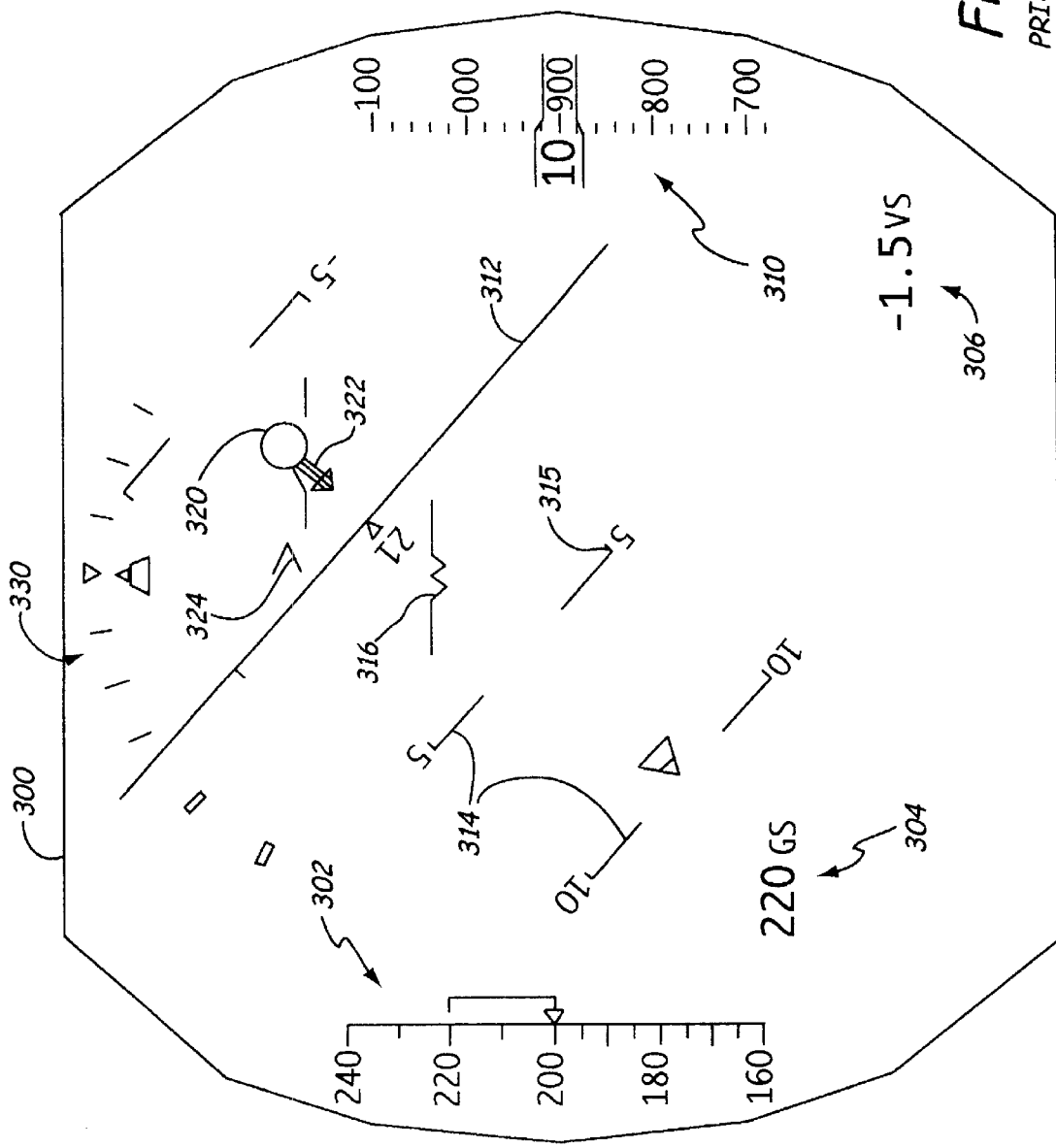
FIG. 4 illustrates a prior art HUD display including an Augie arrow orientation cue.
Figure 5:
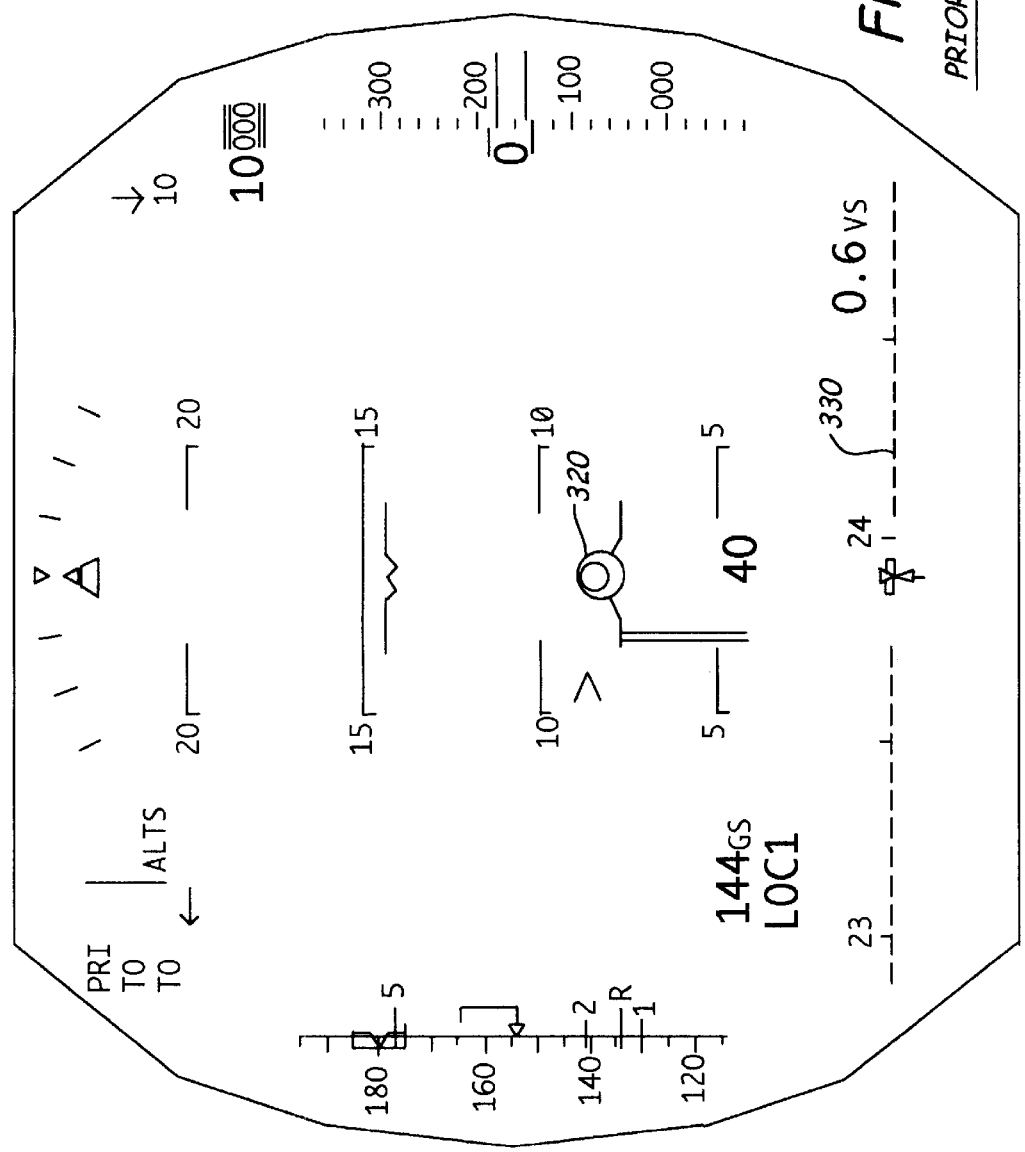
FIG. 5 illustrates a HUD display having a ghost horizon orientation cue.

The UA ball display 420 further includes a pitch ladder, similar to the prior art pitch ladder described with reference to FIG. 4. The pitch ladder in FIG. 6 consists of a series of ladder "steps" 440, each indicating 10 degrees of pitch. Each pitch ladder step is a continuous line, as distinguished from the split steps of some other systems. Negative signs adjacent to the digital pitch degree numbers are omitted, as the simulated section lines vis-á-vis the horizon, as described above, together with the fact that the horizon will always remain on the display (as described later) are deemed sufficient to convey quickly and unambiguously whether the indicated pitch angle is.positive or negative. The same rationale supports omitting other pointers toward the horizon that are typical of prior art pitch ladders (see FIG. 4 reference number 315). The display of FIG. 6 also includes a roll angle scale 446 juxtaposed with the corresponding roll pointer 444. Symbol 450 is a conventional roll reference and slip skid indicator.

Figure 7:
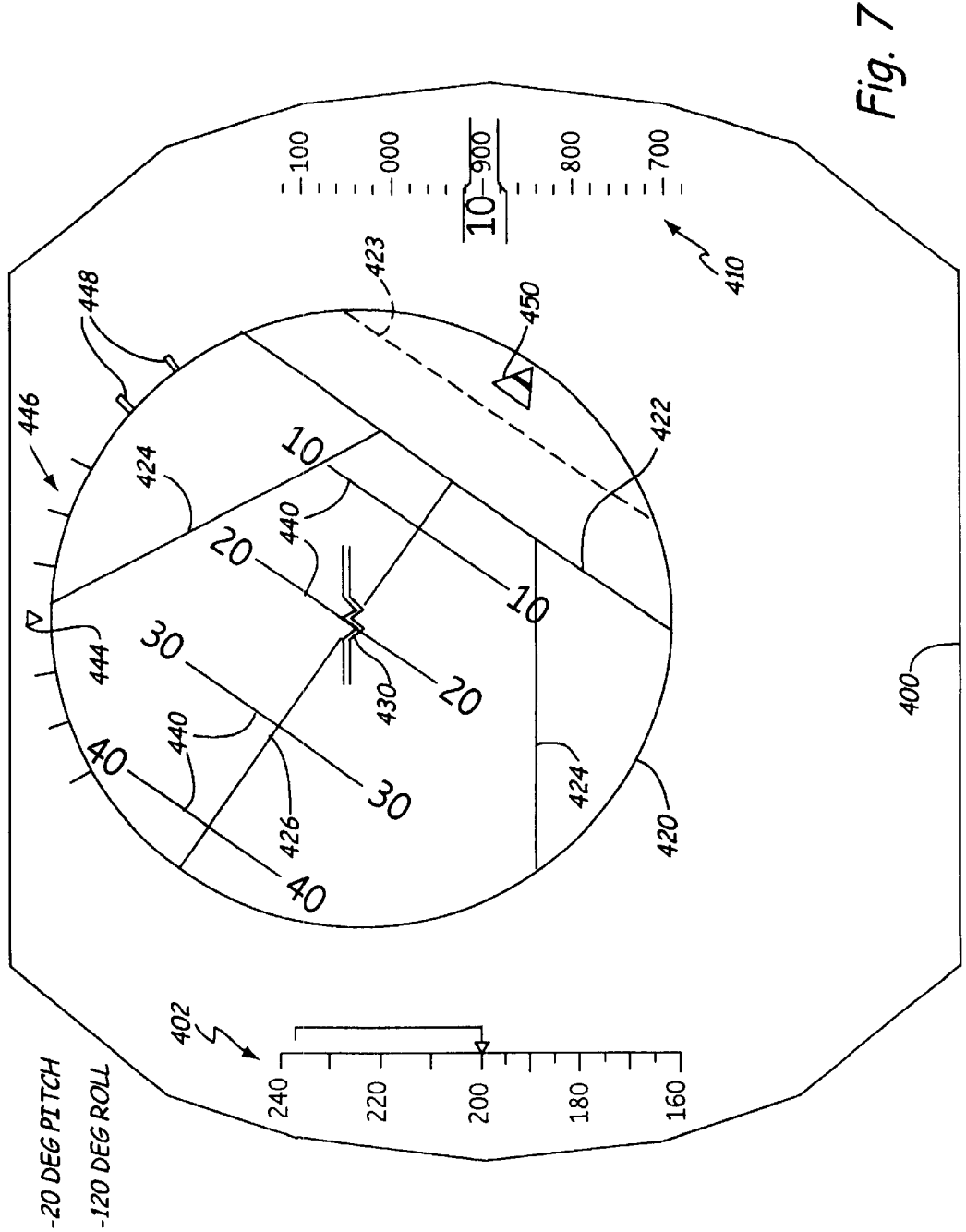
FIG. 7 illustrates a HUD display according to the present invention indicating minus 20 degrees pitch and minus 120 degrees roll.

FIG. 7 illustrates the display 400 of FIG. 6 as it would appear with the aircraft traveling at minus 20 degrees pitch and minus 120 degrees roll. (It is assumed that these figures constitute a UA as the UA display mode is in effect.). The display of FIG. 7 is similar to that of FIG. 6 as it includes substantially the same symbology set. In Figure 7, it can be observed that the double water line symbol 430 intersects the pitch ladder at 20 degrees. However, it is clear that the pitch is negative because the water line is clearly below the horizon 422. This is apparent from the converging section lines 424. In addition, it can be observed in FIG. 7 that the entire display within the UABD 420 is rotated in response to the roll angle. Here, note that roll pointer symbol 450, corresponding to the top of the UABD now appears rotated minus 120 degrees from the top of the display. It should also be noted with regard to FIG. 7 that the horizon 422 does not accurately reflect the location of the horizon in terms of pitch angle relative to the pitch ladder information. If the horizon were displayed conformally, it would appear approximately as indicated in the drawing by dashed line 423. Further, the reader can imagine that if the degree of pitch increased to say minus 35 degrees, the horizon symbol would disappear entirely. Instead, according to the present invention, the pitch ladder is truncated so as to preserve at least a predetermined minimum length of the horizon symbol 422. Thus, the horizon never disappears from the display, even under extreme excursions of pitch and roll. Rather, at least a minimum amount of area is displayed in the UABD both above and below this (sometimes artificial) horizon. In other words, at least a minimal amount of both "down" and "up" are displayed to give the pilot a critical orientation cue at all times.

Figure 8:
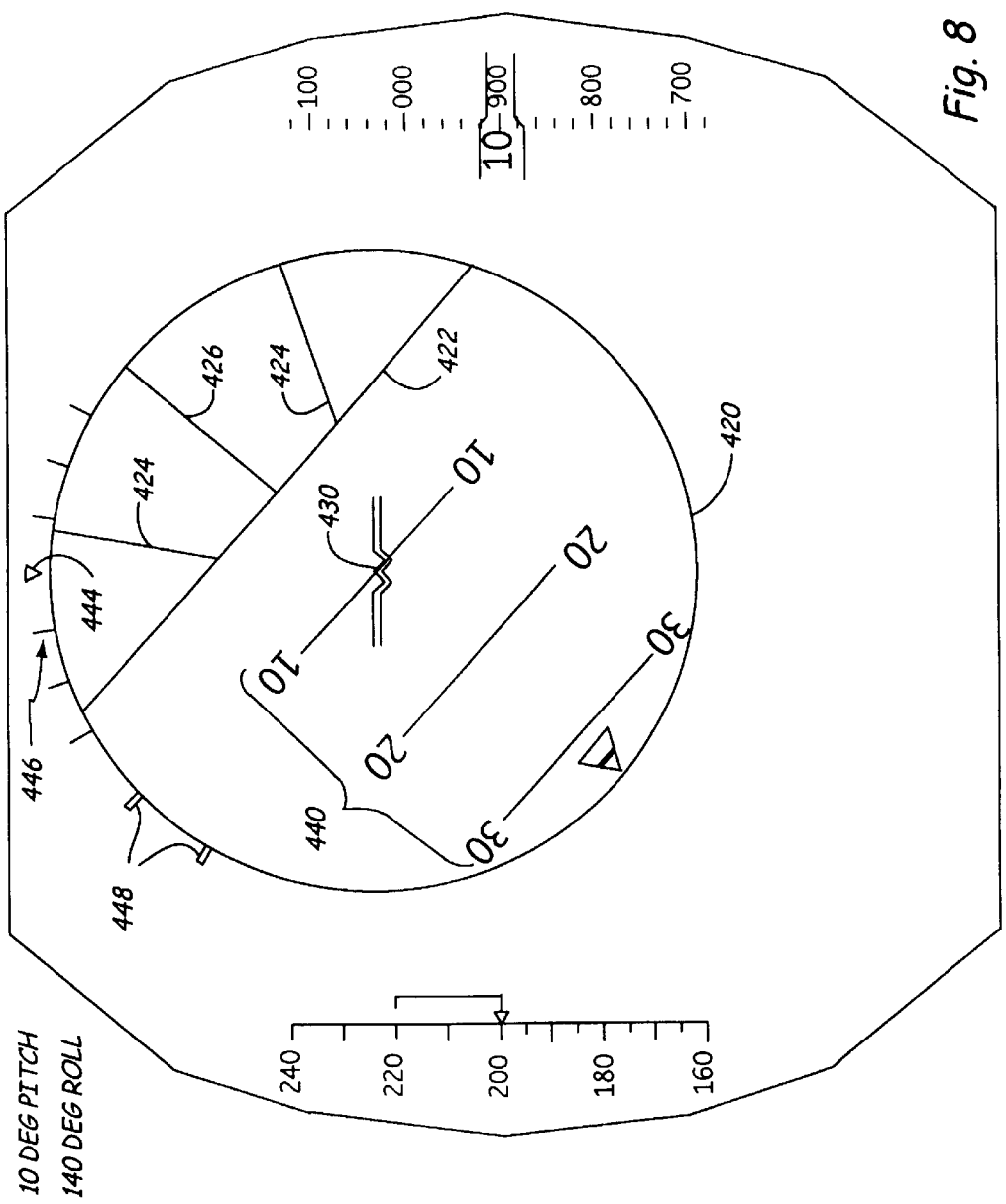
FIG. 8 illustrates a HUD display according to the present invention indicating 10 degrees pitch and 140 degrees roll.

FIG. 8 shows the UA display indicating 10 degrees pitch and 140 degrees roll. Here, the horizon 422 accurately (conformally) indicates the horizon as the pitch ladder is not truncated in this context.

Figure 9:
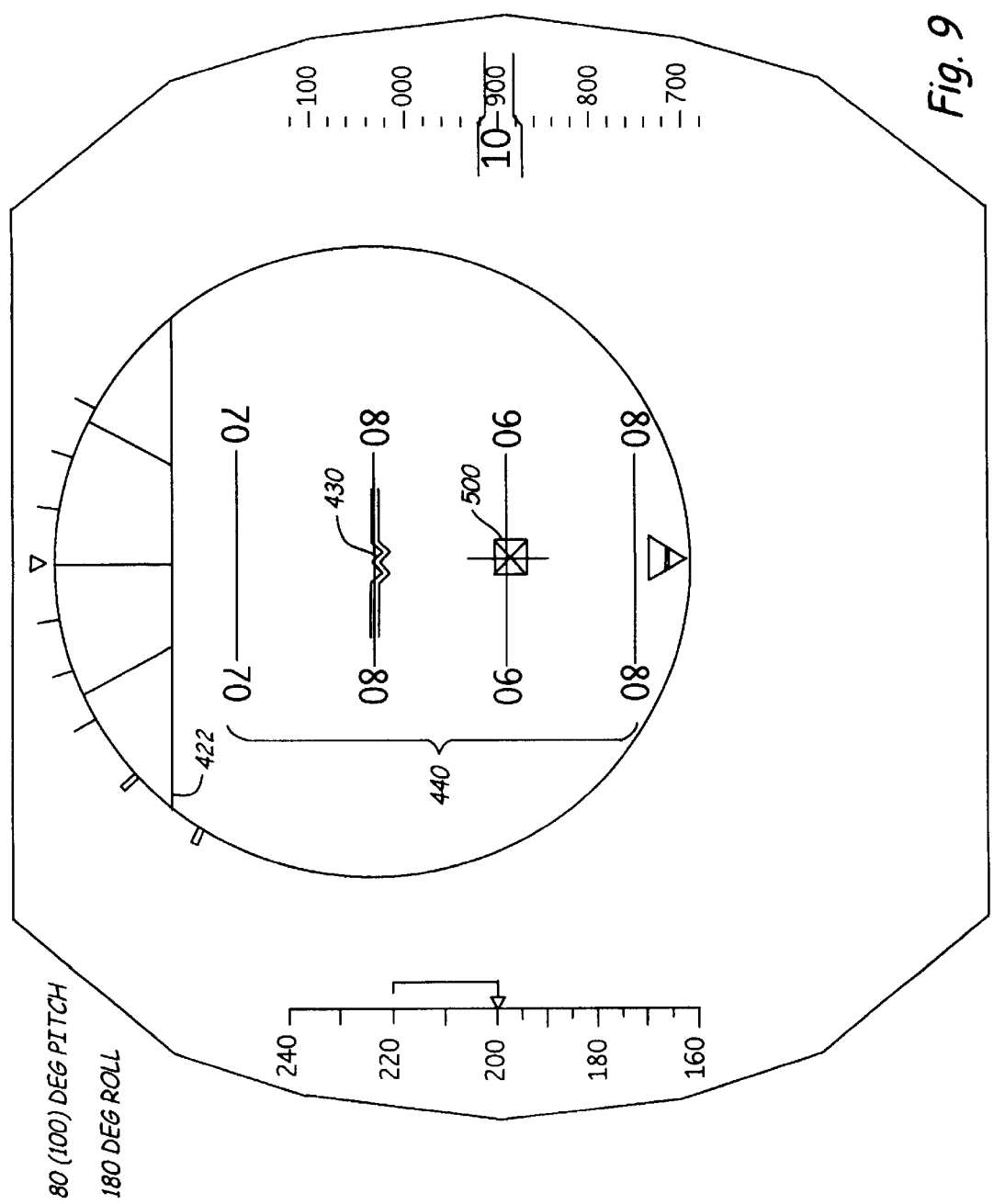
FIG. 9 illustrates a HUD display according to the present invention indicating 80 (100) degrees pitch and 180 degrees roll.

FIG. 9 shows the subject display once again; here indicating 80 (100) degrees of pitch and 180 degree roll. The symbology of the display is similar to that described previously, and further includes a zenith symbol 500.

Figure 10:
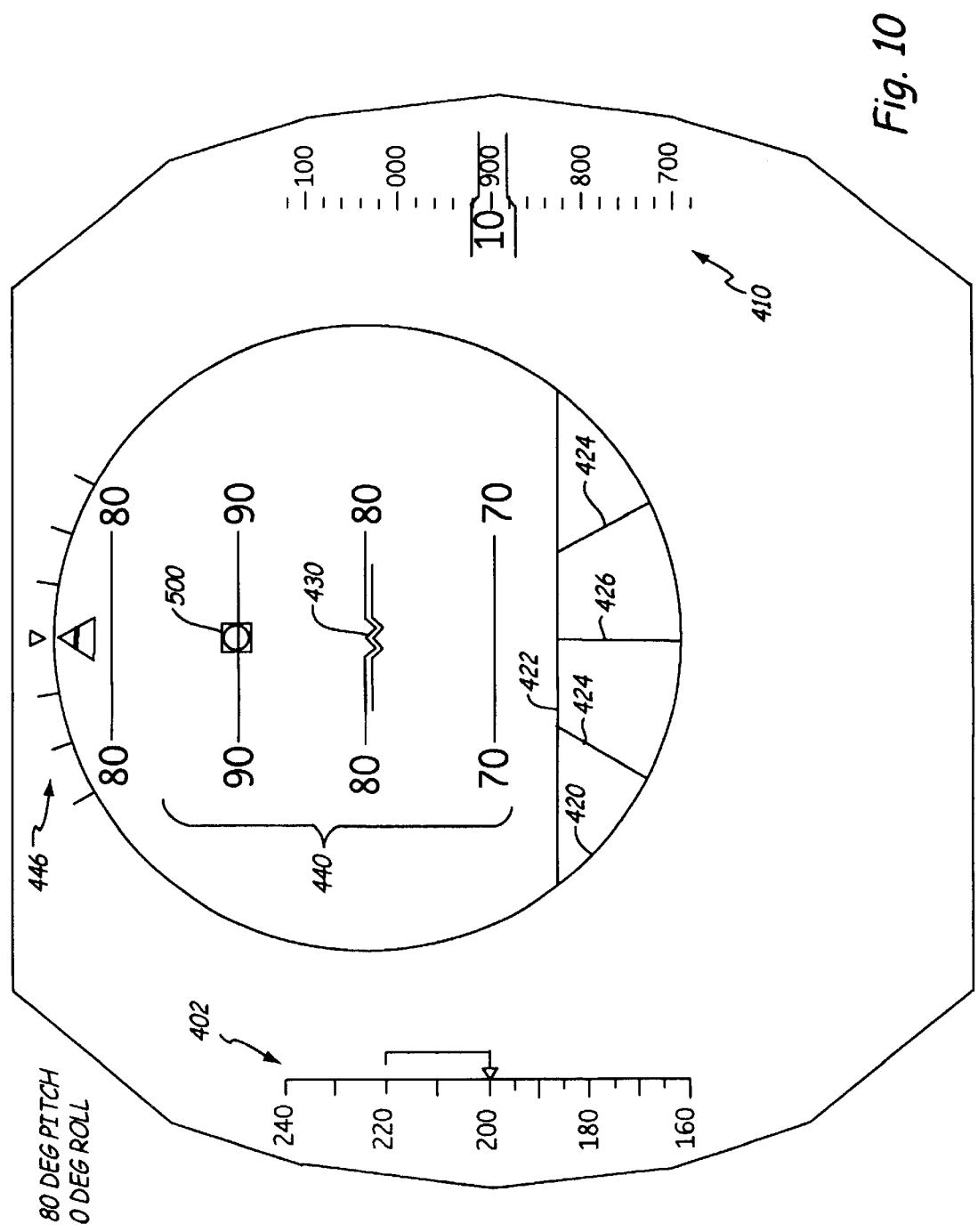
FIG. 10 illustrates a HUD display according to the present invention indicating 80 degrees pitch and 0 degrees roll.

FIG. 10 shows the display for 80 degree pitch and 0 degrees roll. FIG. 10 provides another illustration of the advantage of the persistent horizon symbol 422. In the prior art, at this steep climb angle, either the horizon would disappear from the display, or the pitch ladder would have to be substantially compressed; neither being of much assistance in quickly recognizing and recovering from this UA. Here, the pitch ladder 440 is truncated in order to preserve the horizon 422 on the display. More important, the center line 426 and converging section lines 424 together provide an unambiguous indicator of which direction is down. This symbology, in combination with the persistent horizon 422, as has been shown in this description, provide a valuable orientation cue to the pilot under any and all attitudes of the aircraft.

It is believed that the aircraft head up display system of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of operation of a head up display system in an aircraft comprising the steps of:
    monitoring an aircraft attitude;
    detecting an exceeding of a predefined unusual attitude limit of the aircraft; and
    changing a display of the head up display system from a basic display mode, an en route display mode, or an approach/landing display mode to an unusual attitude display mode when it is detected that the predefined unusual attitude limit of the aircraft is exceeded, wherein the step of changing the display to the unusual attitude display mode further comprises performing the step in a discrete fashion and flashing the display several times in one second to punctuate the changing of the display to the unusual attitude display mode.

2. The method according to claim 1 wherein the step of changing the display to the unusual attitude display mode further comprises removing non-essential symbols appearing in the basic display mode, the en route display mode, or the approach/landing display mode.

3. The method according to claim 1 wherein the step of changing the display to the unusual attitude display mode further comprises displaying the aircraft air speed, altitude, and attitude.

4. The method according to claim 3 wherein the step of displaying the aircraft altitude and air speed comprises displaying the aircraft altitude on an altitude tape indicator and the aircraft airspeed on an air speed tape indicator.

5. The method according to claim 3 wherein the step of displaying the aircraft attitude comprises displaying the aircraft attitude on an attitude indicator, said attitude indicator performing the steps comprising:
    displaying an unusual attitude display element in the form of a closed shape sized to occupy a substantial portion of the display field of view;
    indicating a horizon with a horizon symbol, said horizon symbol comprising a straight line that forms a movable and rotatable line within the unusual attitude display element;
    indicating an area below the horizon with a series of simulated section lines angularly spaced apart and generally converging toward the horizon symbol with one of said section lines being a center line perpendicular to the horizon symbol and the remaining simulated section lines symmetrically arranged about the center line; and indicating degrees of pitch of the aircraft.with a pitch ladder, said pitch ladder further comprising a series of steps spaced apart in predetermined pitch increments with numerals indicating the predetermined pitch increment adjacent each of the series of steps, each of said steps being a line perpendicular to the center line in the series of simulated section lines;

wherein the step of indicating the degrees of pitch of the aircraft further comprises truncating the pitch ladder to preserve a predetermined minimum length of the horizon symbol when the pitch of the aircraft is such that the horizon symbol would otherwise disappear from the display.

6. The method according to claim 5 wherein the step of displaying an unusual attitude display element in the form of a closed shape comprises utilizing one of a group consisting of an ellipse, a circle, a square, and a rectangle.

7. The method according to claim 5 wherein the attitude indicator further indicates an axis parallel to the aircraft fuselage with a water line indicator substantially centered in the unusual attitude display element, and indicates a roll angle of the aircraft with a roll angle scale that includes a roll pointer and a roll reference and slip skid indicator.

8. An aircraft head up display system operably configured to display an aircraft unusual attitude, said head up display system operating in modes comprising:

a basic display mode, an en route display mode, or an approach/landing display mode;

an unusual attitude display mode, said head up display system switching from the basic display mode, the en route display mode, or the approach/landing display mode to the unusual attitude display mode when an aircraft predefined unusual attitude limit is exceeded; and a display for displaying the basic display mode, the en route display mode, the approach/landing mode, or the unusual attitude display mode, and wherein the display in the unusual attitude display mode displays an air speed indicator, an altitude indicator, and an attitude indicator, wherein the attitude indicator includes an unusual attitude ball display sized to occupy a substantial portion of a display field of view, a horizon symbol indicating a horizon, said horizon symbol comprising a straight line that forms a movable and rotatable chord of the unusual attitude ball display, a series of simulated section lines angularly spaced apart and generally converging toward the horizon symbol with one of said section lines being a center line perpendicular to the horizon symbol and the remaining simulated section lines symmetrically arranged about the center line, said series of simulated section lines being displayed in an area of the unusual attitude ball display below the horizon symbol indicating an area below the horizon, and a pitch ladder for indicating aircraft degrees of pitch, said pitch ladder further comprising a series of steps spaced apart in predetermined pitch increments with numerals indicating the predetermined pitch increment adjacent each of the series of steps, each of said steps being a line perpendicular to the center line in the series of simulated section lines, wherein the attitude indicator truncates the pitch ladder to preserve a predetermined minimum length of the horizon symbol when the pitch of the aircraft is such that the horizon symbol would otherwise disappear from the display.

9. The aircraft head up display system of claim 8 further including a display for displaying the basic display mode, the en route display mode, the approach/landing mode, or the unusual attitude display mode, and wherein the head up display system changes in a discrete fashion from the basic display mode, the en route display mode, or the approach/landing mode to the unusual attitude display mode and flashes the display several times in one second to punctuate the changing of the display to the unusual attitude display mode.

10. The aircraft head up display system of claim 8 further including a display for displaying the basic display mode, the en route display mode, the approach/landing mode, or the unusual attitude display mode, and wherein the head up display system removes non-essential symbols appearing on the display in the basic display mode, the en route display mode, or the approach/landing display mode when switching to the unusual attitude display mode.

11. The aircraft head up display system of claim 8 wherein the air speed Indicator is an air speed tape.

12. The aircraft head up display system of claim 8 wherein the altitude indicator is an altitude tape.

13. The aircraft head-up display system of claim 8 wherein the attitude indicator further comprises:

a water line Indicator indicating an axis parallel to the aircraft fuselage and being substantially centered in the unusual attitude ball display; and a roll angle scale indicating the aircraft roll angle, said roll angle scale further comprising a roll pointer and a roll reference and slip skid indicator.

14. An aircraft head up display system, which changes from a basic display mode, an en route display mode, or an approach/landing display mode to an unusual attitude display mode when a predefined unusual aircraft attitude limit is exceeded, comprising a display, said display in the unusual attitude display mode further comprising:

an air speed indicator;

an altitude indicator; and an attitude indicator located between the air speed indicator and the altitude indicator on the display, said attitude Indicator further comprising:

an unusual attitude ball display sized to occupy a substantial portion of a display field of view;

a horizon symbol indicating a horizon, said horizon symbol comprising a straight line that forms a movable and rotatable chord of the unusual attitude ball display;

a series of simulated section lines angularly spaced apart and generally converging toward the horizon symbol with one of said section lines being a center line perpendicular to the horizon symbol and the remaining simulated section lines symmetrically arranged about the center line, said series of simulated section lines being displayed in an area of the unusual attitude ball display below the horizon symbol indicating an area below the horizon; and a pitch ladder for indicating degrees of aircraft pitch, said pitch ladder further comprising a series of steps spaced apart in predetermined pitch increments with numerals indicating the predetermined pitch increment adjacent each of the series of steps, each of said steps being a line perpendicular to the center line in the series of simulated section lines;

wherein the attitude indicator truncates the pitch ladder to preserve a predetermined minimum length of the horizon symbol when the pitch of the aircraft is such that the horizon symbol would otherwise disappear from the display.

* * * * *